(12) United States Patent
Saueressig

(10) Patent No.: US 7,727,431 B2
(45) Date of Patent: Jun. 1, 2010

(54) METHOD FOR PRODUCTION OF A THREE-DIMENSIONAL STRUCTURED SURFACE WITH HAPTICALLY AND/OR OPTICALLY DETECTABLE MICROSTRUCTURES

(75) Inventor: Kilian Saueressig, Vreden (DE)

(73) Assignee: K1 GmbH, Vreden-Lunten (DE)

( * ) Notice: Subject to any disclaimer, the term of this patent is extended or adjusted under 35 U.S.C. 154(b) by 329 days.

(21) Appl. No.: 11/797,005

(22) Filed: Apr. 30, 2007

(65) Prior Publication Data

US 2007/0257390 A1    Nov. 8, 2007

(30) Foreign Application Priority Data

May 4, 2006    (DE)    ........................ 10 2006 020 667

(51) Int. Cl.
| | |
|---|---|
| B29C 51/00 | (2006.01) |
| B29C 51/10 | (2006.01) |
| B21D 22/00 | (2006.01) |

(52) U.S. Cl. ...................... 264/40.1; 264/544; 264/553; 264/320; 72/347

(58) Field of Classification Search ................. 264/523, 264/549, 550, 553, 561, 565, 566, 570, 571, 264/335, 40.1, 544, 320; 29/898.02, 898.1; 72/60, 347; 702/97; 718/1; 703/2

See application file for complete search history.

(56) References Cited

U.S. PATENT DOCUMENTS

| | | | | |
|---|---|---|---|---|
| 3,530,699 A | * | 9/1970 | Uberbacher | ..................... 72/60 |
| 4,154,141 A | * | 5/1979 | Sayles | .......................... 86/1.1 |
| 4,588,215 A | * | 5/1986 | Moxham | .................. 285/382.2 |
| 5,362,519 A | * | 11/1994 | Argyropoulos et al. | .. 427/385.5 |
| 5,510,825 A | * | 4/1996 | Brues | .......................... 347/251 |
| 5,755,129 A | * | 5/1998 | Yamasaki | ..................... 72/57 |
| 5,808,616 A | * | 9/1998 | Shimizu | ..................... 345/419 |
| 6,406,116 B1 | * | 6/2002 | Katakura et al. | .............. 347/15 |
| 6,589,378 B2 | * | 7/2003 | Grefenstein et al. | ......... 156/222 |
| 2003/0141612 A1 | | 7/2003 | Vogt et al. | |
| 2006/0293776 A1 | * | 12/2006 | Hillman et al. | ............... 700/98 |

FOREIGN PATENT DOCUMENTS

| | | |
|---|---|---|
| DE | 19 35 933 B2 | 1/1970 |
| DE | 102 02 752 A1 | 8/2003 |
| WO | WO2005024671 * | 3/2005 |

* cited by examiner

*Primary Examiner*—Kat Wyrozebski
*Assistant Examiner*—Scott W Dodds
(74) *Attorney, Agent, or Firm*—Paul, Hastings, Janofsky & Walker LLP

(57) ABSTRACT

The invention describes a method for production of a three-dimensional structured surface with haptically and/or optically detectable microstructures, in which the microstructures are fixed as a dataset, with the steps: a) preparation of at least a virtual or real elastic film; b) determination of the elongations and compressions produced in the elastic film in the shaping process of the structured surface; c) modification of the datasets so that the elongations and compressions are at least partially compensated; d) checking of an elastic film structured with the modified dataset for distortions in the microstructures; e) if necessary, repetition of steps b) to d), until a final dataset is obtained; and f) structuring of the elastic film, so that at least a structure-supporting surface is produced on the film.

20 Claims, 5 Drawing Sheets

10

12

METHOD FOR PRODUCTION OF A THREE-DIMENSIONAL STRUCTURED SURFACE WITH HAPTICALLY AND/OR OPTICALLY DETECTABLE MICROSTRUCTURES

BACKGROUND

1. Field of the Invention

The invention relates to a method for production of a three-dimensional structured surface with haptically and/or optically detectable microstructures, the microstructures being fixed as a dataset.

2. Background of the Invention

Means for providing three-dimensional surfaces with structures are known. Conventional means, however, often do not satisfy high quality requirements in terms of dimensional stability, distortions or deformations recognizable to a viewer. For example, methods that produce a three-dimensional surface on a three-dimensional structured surface by triangulation are known. However, grain structures, such as those that occur in cowhide, cannot be produced by such methods since they involve an organically grown large-surface grain with continuous branches. In more complex methods, distortions are corrected in a multistage process and corrections of the grain are also repeatedly performed empirically.

BRIEF SUMMARY OF THE INVENTION

In accordance with an embodiment of the present invention, at least one virtual or real elastic film, for which elongations or compressions that are initially produced in the shaping process of the structured surface, are defined in the elastic film. The dataset is then modified, so that the elongations and compressions are at least partially compensated. Distortions in the microstructures are then checked in an elastic film structured with the modified dataset and, optionally, the dataset is modified again, until a final dataset is obtained. The final dataset may contain half-tone data, for example. With this digital dataset, the elastic film is then structured, so that at least a structure-supporting surface is produced on the film. If a virtual film is used, the dataset resulting from it can be converted to a vector data model, with which a grained three-dimensional structured surface could be produced by known methods, such as stereolithography, laser sintering, milling, EDM or laser-direct structuring.

The invention is based on the finding that the distortions and deformations in microstructured three-dimensional surfaces are not detectable if the film is largely stress-relaxed. The method can also be used with printed films, in which the color is treated as purely optical information, similar to the haptic-optic pattern structure or grain structure.

In order to produce a component or molded article with a high-grade three-dimensional surface, an elastic film is therefore initially structured by laser radiation or molded by a roll or plate that was structured beforehand by laser radiation. The dataset is then adjusted to the structured surface of the component. Numerous modifications of the dataset now occur, so that a distortion, for example, of the grain structure, is no longer visible to the viewer and even large-surface grain structures with numerous branches can be produced.

The haptically and/or optically detectable microstructures can be applied to both sides of the film. For example, during use of transparent film, color effects can be achieved. Printing can occur by screen printing, intaglio printing, flexo printing, digital printing or relief printing.

If real elastic films are used, production of the desired component often occurs in a deep drawing process, in which the elastic film is stretched on a die, so that the structure-supporting surface faces the die. This has the advantage that different film thicknesses have no effect on dimensional stability of the forming molded part. A pressure difference is then produced between the side of the structure-supporting surface of the elastic film and its rear surface, so that the elastic film is pulled in the direction toward the die. It is preferable to produce the pressure difference by applying a vacuum, since the structured surface faces the die and the vacuum can act properly over the entire film surface. Alternatively, exposure to pressure can also be used.

For the deep drawing process, it is desirable according to the invention to calculate the different elongation of the elastic film after stretching on the component during deep drawing. The sites with very high elongation are compressed accordingly in the dataset for laser treatment and the surrounding areas elongated. The same applies for the depth direction and areas with higher elongation are provided with greater depth than the areas with lesser elongation. Compression and elongation then are on the order of about 10 to 30%. Larger compressions lead to changes in grain structure, which are then visible to the viewer and are recognized as distortions or blurriness.

Since elongations of some 100% or more can occur in a deep drawing process, additional steps may be desired in order to produce a component surface free of distortion for the viewer. For this purpose, according to an embodiment of the invention, the back side of the film is provided, at least in some areas, with a three-dimensional macrostructure that corresponds to the elongation profile. The thickness of the film is then greater in the areas having higher expected elongation in the deep drawing process.

In a subsequent step, the film can also be provided with a depth-variable and width-variable profile in the edge regions that later do not cover the component. This weakened edge area takes up most of elongation, which therefore no longer falls in the structure-supporting area of the film.

As a further step, friction between the elastic film and the die may be reduced via a special process, so that relatively homogeneous stress can be produced in the film.

One such expedient is to introduce a friction-reducing fluid between the film and die. Air or oil may be an appropriate fluid. The friction-reducing fluid can be a curable fluid, which is cured after stress relaxation of the film is completed.

The curable fluid can also contain parting agents, which are provided with ceramic pigments or electrically conducting agents, in order to simplify later mold release or coating.

Another expedient consists of producing one or more sliding cushions in the partial areas of the interface between the film and die. For this purpose, the die is provided, for example, with numerous holes that discharge into the interface between the film and die, which are exposed to a fluid, in order to reduce the vacuum at these sites. The film can relax, because of the reduced friction, so that a very homogeneous stress distribution can be created.

Finite element calculation, which considers both the distortion of the haptic and/or optic microstructures and the back profile of the elastic film being laser treated, has worked as a mathematical tool. Calculation is then repeated with altered parameters, until the optimal result is present.

In another embodiment of the invention, when stress reduction is optimized, steps, like partial compression, elongation or the like, can be dispensed with and a good result still achieved, since the distortion of the microstructures is largely proportional to the stress differences within the film over the deep drawing process. In this case, a homogeneous distortion is only applied over the film, namely, the surface and depth adaptation, which is the same in all areas. Calculation by finite elements can drop out. Only the base elongation of the film may be determined.

The method according to the invention can be used, in general, in the production of embossed films. In this case, the front side generally carries the pattern, the back side the thickness profile. This three-dimensional macrostructure on the back side can be smoothed, by means of foam or a polymer layer, with a much smaller modulus of elasticity than that of the film carrying the pattern structure. This permits the use of film during covering of components.

The back side of the film can be provided with a corresponding rough surface for better adhesive bonding. This roughening can occur, for example, by back embossing or laser treatment.

An embodiment with a variable three-dimensional macrostructure on the back of the film is particularly suited for films used from deep drawing of functional components with different component geometries. In this case, only during a rotary embossing process in both sides is it necessary to replace the roll that imparts the back embossing, i.e., the embossing that imparts to the film a different thickness corresponding to the later elongation.

BRIEF DESCRIPTION OF THE DRAWINGS

The invention will be further explained below with reference to the drawing.

In the drawing.

DETAILED DESCRIPTION OF THE INVENTION

Figure 1A:
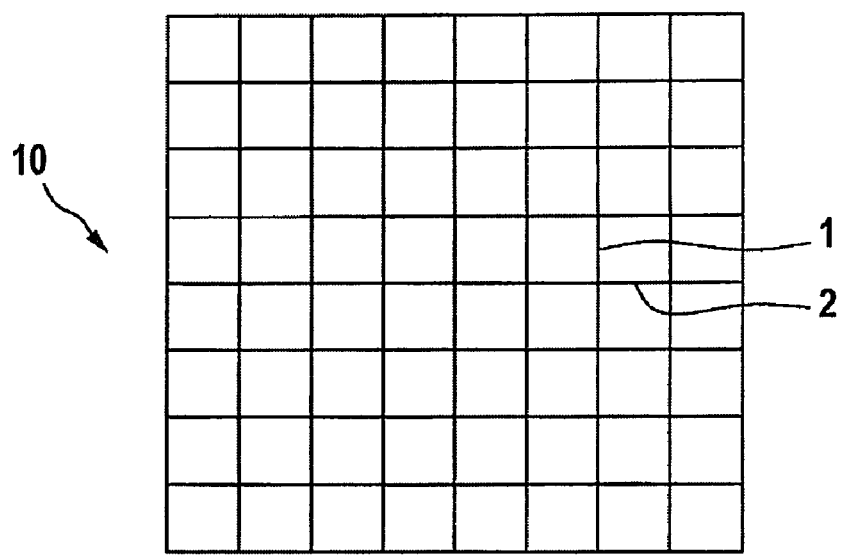
FIG. 1a shows an elastic film with a virtual grid network before the deep drawing process.
Figure 1B:
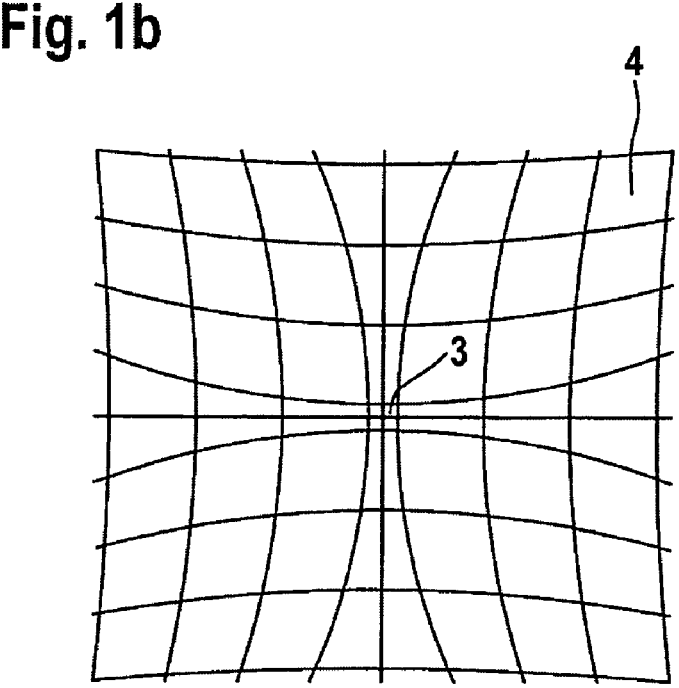
FIG. 1b shows an elastic film with a virtual grid network after the deep drawing process.

FIG. 1a shows an elastic film 10, onto which a virtual grid network of essentially parallel and orthogonal lines 1, 2 is applied. In a deep drawing process, with reference to FIG. 1b, sites 3 with high elongation are compressed and sites 4 with low elongation are elongated. The dataset of, for example, a grain structure, is correspondingly adapted and can be transferred into the film, for example, by laser structuring.

Figure 2:
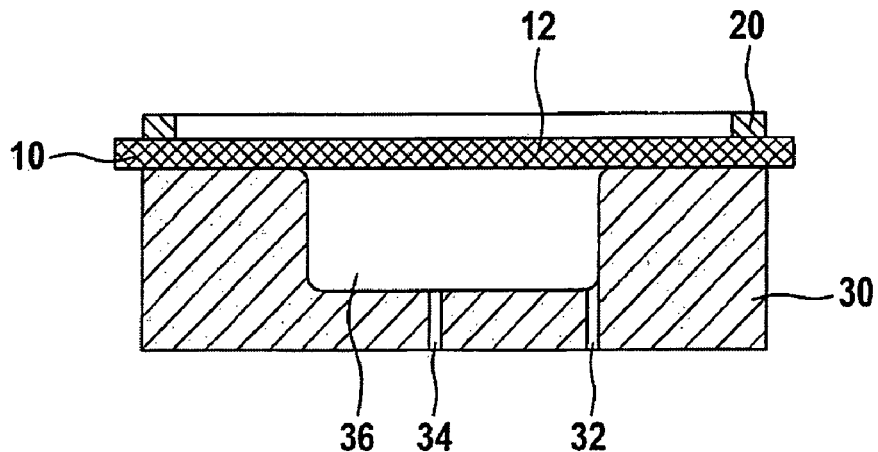
FIG. 2 shows a schematic cross-section of a direct-structured film that is to be deep drawn.
Figure 3:
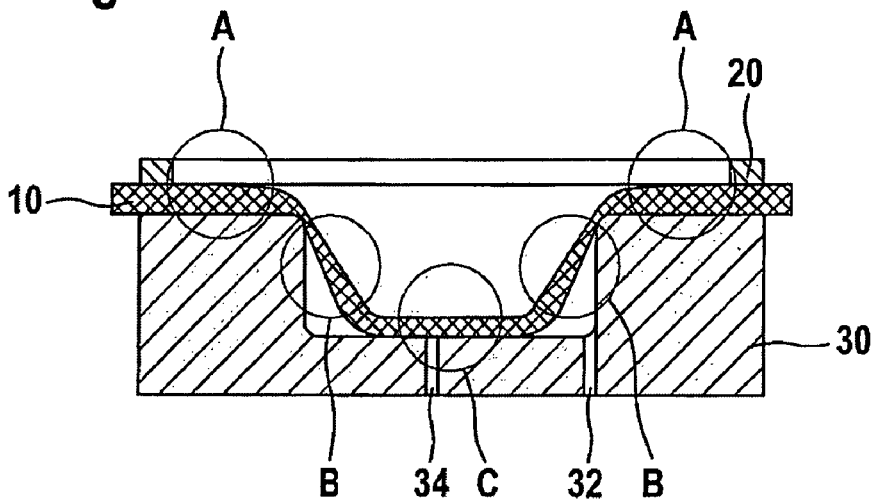
FIG. 3 shows a schematic view representing the effect of different friction on elongation of the films.

FIG. 2 shows how a structured film 10 is further processed by means of a deep drawing process. The film 10 is stretched on a die 30 by means of a circulating frame 20 with its structured surfaces 12 facing a prepared die 30. The space of the die 30 lying under the film 10 is now exposed to vacuum via tubes 32, 34. Alternatively, instead of vacuum exposure, a pressure can also be applied from the exposed top of the film 10. The film 10 will initially encounter areas A on the surface of die 30 when the vacuum is active wherever the film 10 comes in contact with the surface of die 30. Friction then develops between film 10 and the surface of the die 30, which counteracts further elongation of the film 10 in areas A. The same applies if film 10 lies against the bottom of die 30 in area C. Areas B of film 10, which still have no contact with the surface of die 30, are accordingly elongated more.

Figure 4:
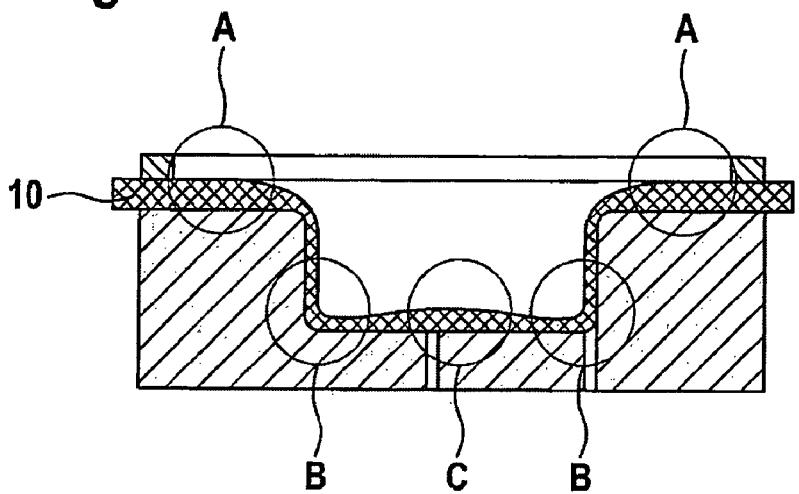
FIG. 4 shows the deep drawn film in the die.

FIG. 4 shows the result. Film 10 is elongated least in areas A (i.e., is thicker), more strongly elongated in area C, and most elongated in areas B. These different elongations may be undesirable and are compensated as follows.

Figure 5:
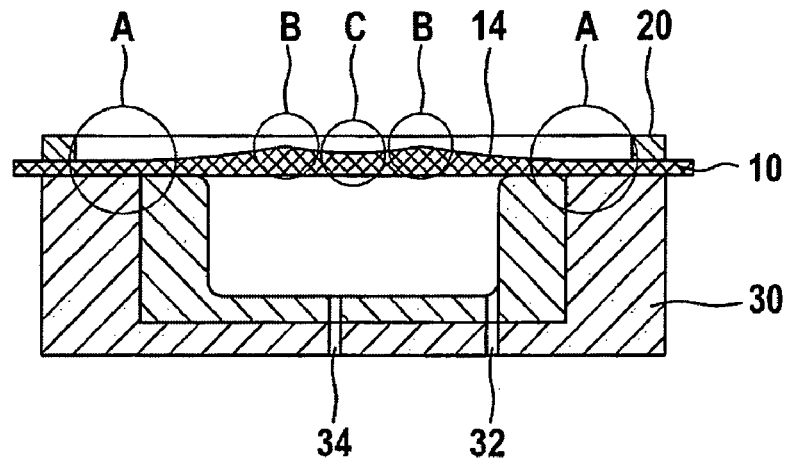
FIG. 5 shows a modification of the film according to a preferred variant of the invention with three-dimensional macrostructure applied to the back.
Figure 6:
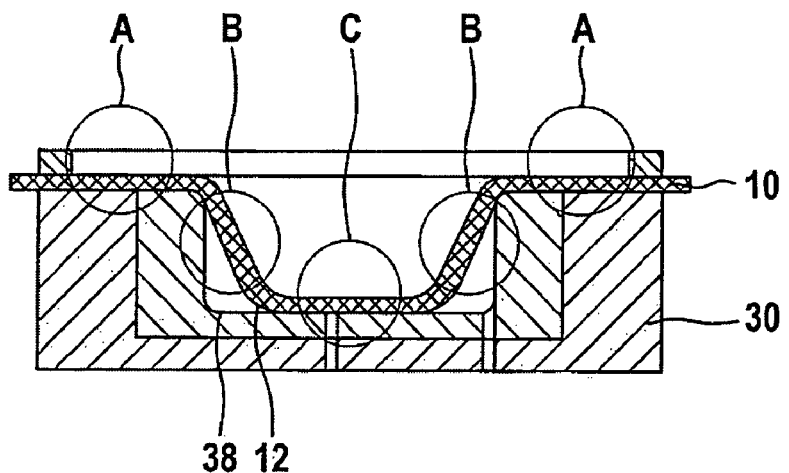
FIG. 6 shows the elongation trend of the film with the macrostructure.

For this purpose, as shown in FIG. 5, the film 10 is configured with different thicknesses. The thickness in areas B, which correspond to strongly elongated portions during deep drawing, are designed with correspondingly greater thickness. Areas A are the least elongated and therefore have the lowest thickness. Accordingly, the thickness of film 10 in an area C lies between the thickness in areas A and in areas B. If the exposed top of the film is exposed again to vacuum through openings 32 and 34 or to pressure, as is shown in FIG. 6, the elongation within film 10 will now become much more homogeneous than as previously described. In addition, a lubricant can be provided on the surface 38 of the die 30, and/or the structured surface 12 of film 10 in order to reduce the friction between film 10 and die 30. Since the surface 12 of film 10 also carries the pattern structure, the vacuum can act properly over the entire surface of film 10.

Figure 7:
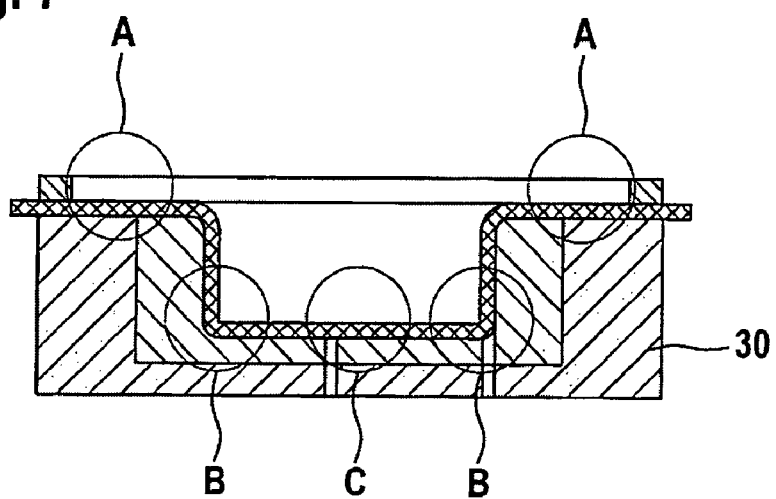
FIG. 7 shows the result with optimized profiling of the film.

FIG. 7 shows how the film 10 has a uniform thickness throughout, because of the stress homogenization in it.

Figure 8:
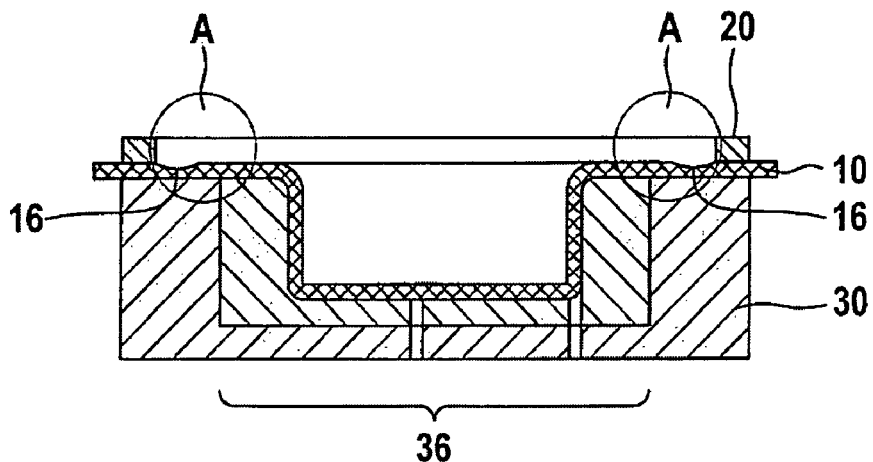
FIG. 8 shows another variant for configuration of the back side profile of the film.

FIG. 8 shows how the effect of stress homogenization can be further increased by additional expedients. For example, the thickness of the film 10 can be reduced in area A that is within the frame 20 but that is not in contact with the component 36, so that a stronger pull-in of film 10 in the region of component 36 becomes possible. Area A, most of which is not in contact with the component 36, can be provided, for example, with a structured surface, laid out so that the film 10 must cover the same elongation path in all directions. During utilization of the method for digital creation of a structured surface with a design surface, those areas that later do not contact the component 36 can be defined relative to infinity.

Figure 9:
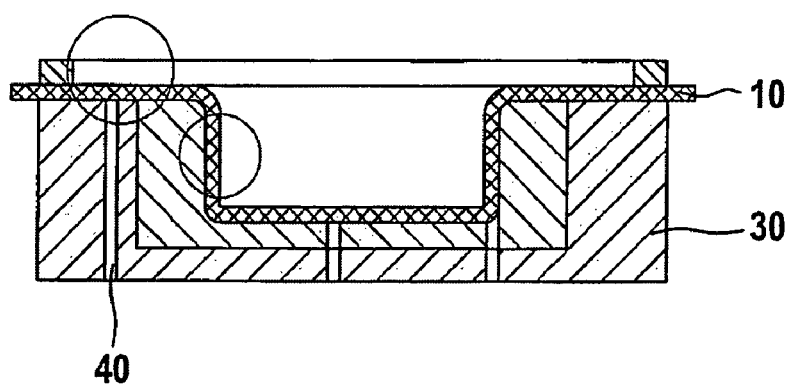
FIG. 9 shows the use of vacuum reduction for friction reduction.
Figure 10:
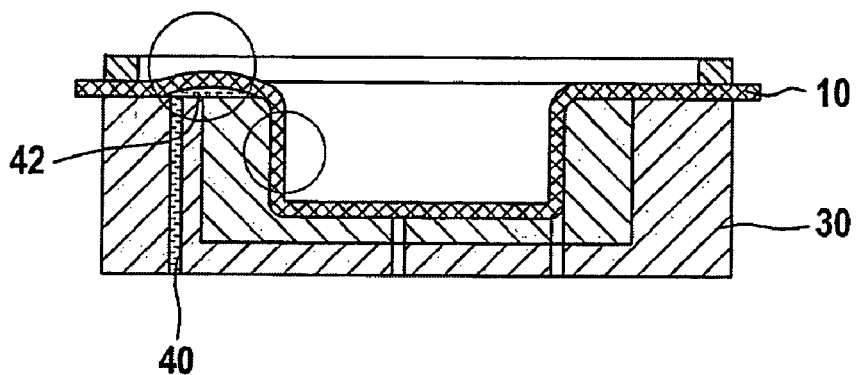
FIG. 10 shows the sliding cushion produced by vacuum reduction for friction reduction.

A further improvement can be achieved, if the vacuum is deliberately reduced between film 10 and die 30. For this purpose, a number of holes 40 can be made in die 30, only one of which is shown in FIG. 9, which are supplied with a fluid, for example, a lubricant, such as oil or air. Because of this, as shown in FIG. 10, the friction between film 10 and die 30 is drastically reduced and a sliding cushion 42 is produced here, whereas the vacuum in the other areas holds the film 10 on die 30. The stress differences within film 10 can be further broken down by the several sliding cushions 42. The films used in the deep drawing process are generally not deformed thermoplastically. The sliding cushions 42 can therefore be driven several times in alternation. With each repetition of buildup and breakdown of the sliding cushions 42, the stress differences in the film 10 are reduced and tend toward zero.

In this variant of the invention, it can be considered to provide a curable medium, for example, a polymer, as lubricant. As soon as the stress relaxation is completed, the polymer may be cured on the film 10. The film 10 can then be removed from the die 30 and a functionally capable molded part is produced. The part was essentially produced in only two working steps, including laser treatment of the film 10 to apply the microstructure, and deep drawing of the film 10. Since the polymer layer is produced and cured directly on the die, a functional molded article with very high accuracy is produced, which significantly exceeds those of silicone castings or sintered moldings or similar methods. The curable medium may optionally be a parting agent and contain ceramic pigments or the like, or a conducting coating can be used that contains metal pigments or the like, in order to simplify subsequent coating or casting.

Figure 11:
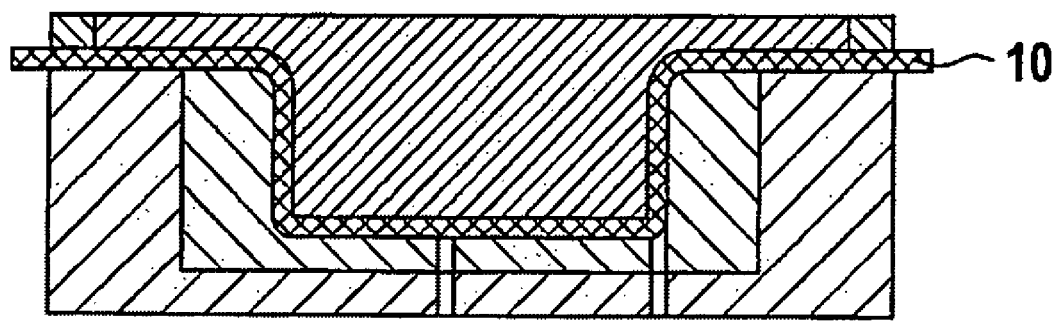
FIG. 11 shows the finished deep drawn film provided with a rear lining.
Figure 12:
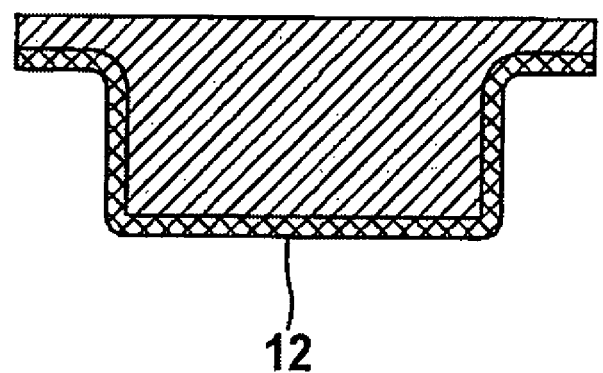
FIG. 12 shows the finished molded article.

An alternative method for producing a component, as shown in FIG. 11, consists of back-filling the film 10, which is stress-relaxed, with a foamable or fiber-reinforced polymer. The homogeneous elastic stresses within back-filled film 10 are frozen-in by this expedient. The component is then released from the mold. Such a component is thereby formed with high dimensional stability, as shown in FIG. 12. The component may have high-grade grain structure on the structured surface 12, which can be used as a molding die, copy or as a molded article.

As a further example, it will be described how the method according to the invention can be used to produce a component with a three-dimensional surface, without actually using an elastic film. In this case, similar to the above described process, a virtual component is covered with a virtual film. The dataset resulting from this can then be converted to a vector data model, which serves as a basis for a component with a grained three-dimensional structured surface.

This structured surface can then be produced by a known method, like stereolithography, laser sintering, milling, EDM or laser-direct structuring. In practice, however, this proves to be extremely difficult. For example, there are approaches that produce the components by laser-direct structuring. Guiding of the laser beam is not possible, because of the high required resolution in practice, since orthogonal positioning of the laser beam with an accuracy of a few micrometers is not possible in large dies with the present die machine. Positioning of the laser is also difficult if the die has a high aspect ratio and therefore is not accessible for a laser or milling head. In stereolithography, this is also problematical, since a laser beam is used, in the first place, which produces the component over a central mirror via an exposure process, and the beam cross section is therefore varied according to the position of the component surface being exposed. In the second place, the components produced in this way from photopolymers are not suitable for use as wear-resistant dies. Laser-sintered components do have very good wear properties in comparison with stereolithography of photopolymers, but do not exhibit either dimensional stability or high resolution.

For this reason, a steel core is initially milled with a dimensional deviation. The dimensional deviation then corresponds at least to the grain depth. The steel core serves to give higher stability and dimensional stability to the later structured surface. In the subsequent exposure process, the grain is directly produced on the steel core by means of the digital dataset. The laser is only moved in two axes, the X-axis and the Y-axis. The Z-axis is only necessary if the autofocus mode is not used. The three-dimensional surface is then traversed slice-like or the component is placed in rotation and the laser only moved in one axis. Spiral exposure, line exposure and contour exposure are possible.

The digital dataset can also be used for other manufacturing methods, such as milling technology, EDM and the like, for die production.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of producing a three-dimensional structured surface with haptically and/or optically detectable microstructures that are fixed as a dataset, the method comprising:
   a) preparing a first virtual or real elastic film having a structured surface;
   b) determining the elongations and compressions in the first virtual or real elastic film that would be produced in a shaping process of the structured surface;
   c) modifying the dataset so that the elongations and compressions are at least partially compensated;
   d) checking a second virtual or real elastic film structured with the modified dataset for distortion in the microstructures affected by the shaping process of the structured surface;
   e) if necessary, repeating steps b) through d) until a final dataset is obtained; and
   f) structuring a real elastic film according to the final data set, so that a structured surface is produced on the real elastic film, the back side of the real elastic film being provided at least in areas with a three-dimensional macrostructure that corresponds to an elongation profile, wherein the film thickness is correspondingly greater in areas that correspond to portions of the real elastic film that were strongly elongated during the shaping process, wherein step f) comprises structuring the real elastic film using a dies, and the side of the real elastic film having the structure-supporting surface faces the die;

wherein at least one sliding cushion is produced between the die and the film; and wherein at least one sliding cushion is repeatedly activated and deactivated.

2. The method according to claim 1, wherein the final dataset is converted to a vector data model for the structured surface.

3. The method according to claim 1, wherein the final dataset contains half-tone data.

4. The method according to claim 1, wherein the edge area of the real elastic film structured according to the final dataset is weakened to accommodate elongations.

5. The method according to claim 1, wherein a pressure difference is generated between the structured surface side of the real elastic film and the opposite side of the real elastic film so that the real elastic film is pulled in a direction toward the die.

6. The method according to claim 1, wherein a friction-reducing fluid is introduced between the film and the die.

7. The method according to claim 1, wherein a plurality of sliding cushions are produced between the die and the film, and wherein at least two sliding cushions are activated and deactivated in alternation.

8. The method according to claim 6, wherein the friction-reducing fluid is air or oil.

9. The method according to claim 6, wherein the friction-reducing fluid is a curable fluid that is cured after stress relaxation is completed.

10. The method according to claim 9, wherein the curable fluid contains a parting agent.

11. The method according to claim 10, wherein the parting agent has ceramic pigments.

12. The method according to claim 9, wherein the curable fluid contains electrically-conducting agents.

13. The method according to claim 1, wherein structuring the film further comprises:
   (a) back-filling the real elastic film; and
   (b) mold releasing the back-filled real elastic film.

14. A method of producing a three-dimensional structured surface with haptically and/or optically detectable microstructures that are fixed as a dataset, the method comprising:
   a) preparing a first virtual or real elastic film having a structured surface;
   b) determining the elongations and compressions in the first virtual or real elastic film that would be produced in a shaping process of the structured surface;
   c) modifying the dataset so that the elongations and compressions are at least partially compensated;
   d) checking a second virtual or real elastic film structured with the modified dataset for distortion in the haptically and/or optically detectable microstructures affected by the shaping process of the structured surface;
   e) if necessary, repeating steps b) through d) until a final dataset is obtained; and
   f) structuring a real elastic film according to the final data set, so that a structured surface is produced on the real elastic film,
   wherein:
      step f) comprises structuring the real elastic film using a die,
      at least one sliding cushion is produced between the die and the film, and
      at least one sliding cushion is repeatedly activated and deactivated.

15. The method of claim 14, wherein at least two sliding cushions are activated and deactivated in alternation.

16. The method of claim 14, further comprising back-filling the film with a foamable or fiber-reinforced polymer.

17. The method of claim 14, wherein the edge area of the real elastic film structured according to the final dataset is weakened to accommodate elongations.

18. The method of claim 14, wherein a pressure difference is generated between the structured surface side of the real elastic film and the opposite side of the real elastic film so that the real elastic film is pulled in a direction toward the die.

19. The method of claim 14, wherein the friction-reducing fluid is a curable fluid that is cured after stress relaxation is completed.

20. The method of claim 19, wherein the curable fluid contains a parting agent.

* * * * *